Sept. 4, 1951 C. L. KRUMREICH 2,566,840

SWITCH FOR TELEPHONE SUBSTATION SETS

Filed Sept. 16, 1948 4 Sheets-Sheet 1

INVENTOR
C. L. KRUMREICH
BY
Walter C. Kiesel
ATTORNEY

Sept. 4, 1951 C. L. KRUMREICH 2,566,840

SWITCH FOR TELEPHONE SUBSTATION SETS

Filed Sept. 16, 1948 4 Sheets-Sheet 2

INVENTOR
C. L. KRUMREICH
BY
Walter B. Kiesel
ATTORNEY

Sept. 4, 1951 C. L. KRUMREICH 2,566,840

SWITCH FOR TELEPHONE SUBSTATION SETS

Filed Sept. 16, 1948 4 Sheets-Sheet 3

INVENTOR
C. L. KRUMREICH
BY
Walter C. Kiesel
ATTORNEY

Sept. 4, 1951 C. L. KRUMREICH 2,566,840

SWITCH FOR TELEPHONE SUBSTATION SETS

Filed Sept. 16, 1948 4 Sheets-Sheet 4

INVENTOR
C. L. KRUMREICH
BY
Walter C. Kiesel
ATTORNEY

UNITED STATES PATENT OFFICE 2,566,840

SWITCH FOR TELEPHONE SUBSTATION SETS

Charles L. Krumreich, North Arlington, N. J., assignor to Bell Telephone Laboratories, Incorporated, New York, N. Y., a corporation of New York Application September 16, 1948, Serial No. 49,570

6 Claims. (Cl. 179—100)

This invention relates to telephone substation apparatus and more particularly to contact spring assemblies for telephone sets.

In telephone sets, the various elements of the substation apparatus, such as the transmitter, receiver, dial, and associated transmission apparatus, are connected through spring contacts to a telephone line leading, for example, to a central office. These contacts may close or open circuits, or transfer a connection from one point in a circuit to another. In general, the spring contacts are actuated by the placement of the telephone instrument, such as the hand telephone, upon the mounting of the set or removal of the instrument from the mounting.

In order that the elements of the telephone set may be connected in the circuit properly, it is necessary in many instances that the various connections be established or broken in a particular sequence. To accomplish this a variety of constructions have been proposed. In known constructions, however, the relations of the several contact springs are susceptible to variation after the set has been assembled, thereby introducing unwanted deviations in operation. Also such constructions are often expensive and difficult to produce in quantity.

One general object of this invention is therefore to improve the structure and operation of contact spring assemblies in telephone substation apparatus.

More specifically, objects of this invention are:

To facilitate the attainment of a desired sequence of operation for a number of switch contacts in telephone substation apparatus:

To increase the life of the contact springs;

To simplify and reduce the cost of contact springs assemblies; and

To facilitate the repair of telephone sets.

In one illustrative embodiment of this invention a mounting for a hand telephone comprises a housing having a cradle portion for accommodating the instrument, an assembly including a plurality of sets of contact springs, within the housing, and an actuating system including a plunger extending from within the housing into the cradle portion for effecting operation of the spring contacts in response to the placement of the hand telephone in the cradle portion or its removal.

In accordance with one feature of the invention, the actuating system includes a pair of cooperating members, one of which is fixed and the other of which is movable with the plungers, for determining operation of several sets of contact springs in a prescribed sequence.

In one illustrative embodiment of this invention the fixed member is a block of insulating material, as of plastic, adjacent the springs and having grooves in it for providing stopping surfaces to position some of the springs, and the movable member is an operating member or card extending through the springs and cooperating with them.

In another illustrative embodiment of this invention a fixed member or card is utilized instead of the block. This fixed member also extends through the springs and cooperates with some of them.

In accordance with another feature of this invention, a snap catch is provided to hold the switch so as not to connect the telephone to the line when the instrument is removed and the mounting opened for repairs.

In accordance with a further feature of this invention the operating card is constructed to be insertable into the springs and the coupling member and to be locked in position by rotation.

A complete understanding of the invention and appreciation of the various features thereof may be gained from consideration of the following detailed description with reference to the accompanying drawings, in which.

Figure 1:
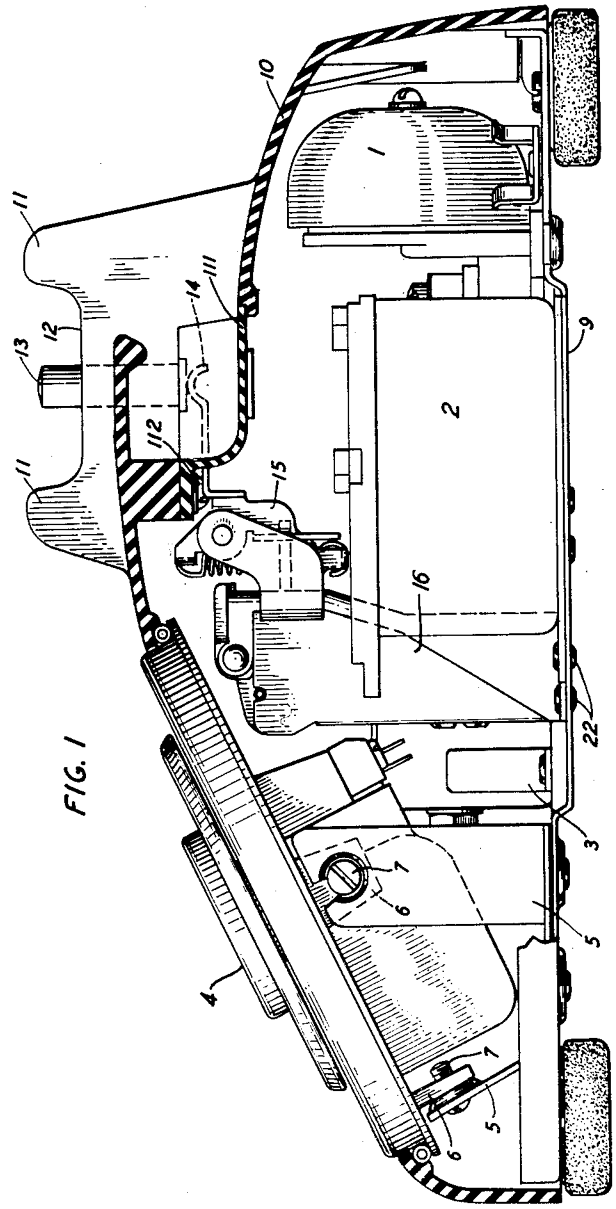
Fig. 1 is a view in section of a desk type combined set including a contact spring assembly constructed in accordance with this invention, and showing the manner in which the assembly is mounted and used.
Figure 4:
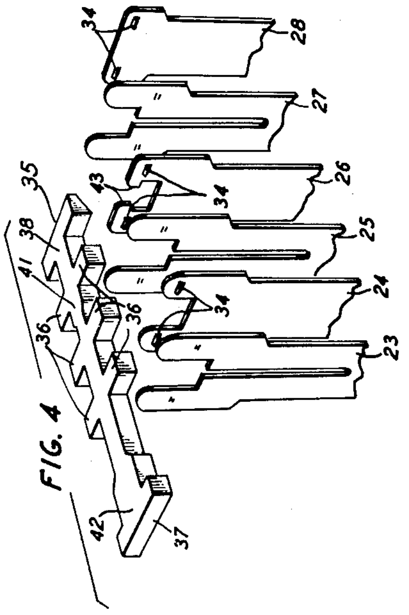
Fig. 4 is a detail perspective view of the operating member or card and the free end portions of the contact springs.
Figure 2:
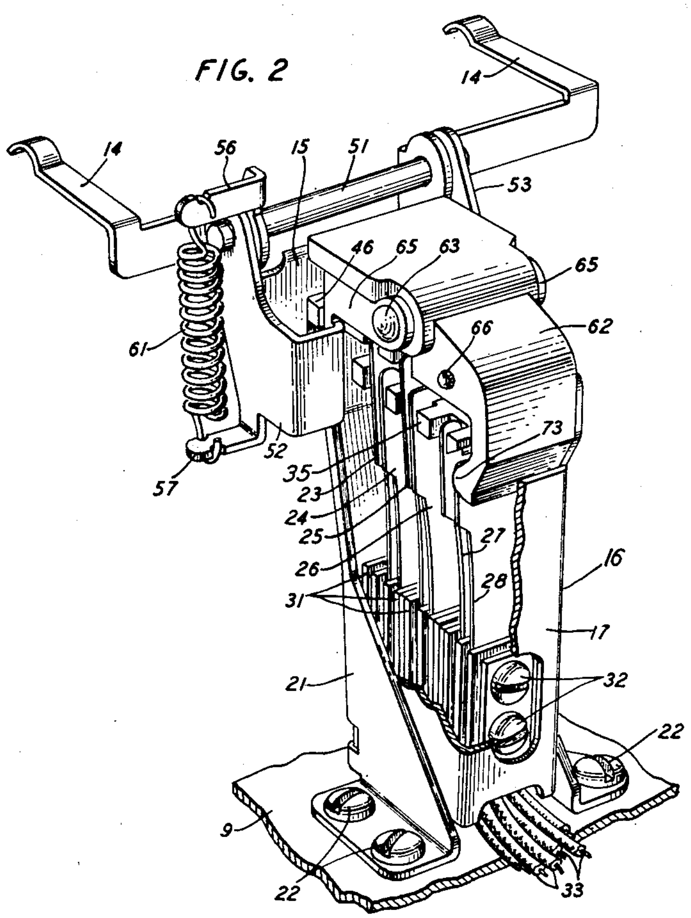
Fig. 2 is a view in perspective of the contact spring assembly included in the set shown in Fig. 1 with a portion of the housing therefor being broken away to show details of internal structure more clearly.

Referring now to the drawings, Fig. 1 shows a telephone mounting of the type intended to be used on a desk in conjunction with a handset or telephone instrument. The telephone mounting has a removable cover or case 10 over certain of the set components, including the contact spring assembly, designated as a whole by 16, the ringer unit 1, the housing 2 which contains certain of the electrical elements included in the substation circuit, an equalizer unit 3, and a dial unit 4. All of these elements are fastened to the base 9 of the mounting. The dial unit 4 is fastened to the base 9 by means of arms 5 extending up from the base 9 and arms 6 extending down from the unit, which are joined together by screws 7. As none of the set components is supported by or fastened to the cover 10 it may be removed without impairing proper operation of the telephone set.

The cover 10 may be of plastic or metal adapted for molding or casting, while the base 9 may be a metal plate. The cover may also be made in a single piece or, particularly if molded, be made of more than one piece so as to simplify molding. As shown in Fig. 1, the cover 10 is in two parts, the portion 111 being attached to the cover 10 by a screw 112.

Integral with the cover 10 are two pairs of fingers or tines 11, only one pair of which is shown, extending from the housing 10 and forming a cradle portion 12 for accommodating the hand telephone. Two plungers or actuating members 13 extend from within the case 10 into the cradle portion 12. The plungers rest on arms 14 of a coupling member 15 of the contact spring assembly, which is designated as a whole as 16. This contact spring assembly 16, Fig. 2, includes a housing 17 and a bracket 21. The bracket 21 is attached as by screws 22 to the base 9 of the mounting. Within the bracket 21, in the embodiment shown in Figs. 1 to 6, are a plurality of leaf contact springs 23, 24, 25, 26, 27 and 28 which are insulated from each other and from the bracket 21 by flat insulators 31 and which are assembled in a row and secured to the bracket 21 by screws 32. The contact springs are connected to appropriate leads 33 through terminal lugs 30. The free ends of the contact springs are bifurcated except for contact spring 28 which is the last in the row. A contact 34 is placed on each of the bifurcated portions of the spring contacts 23 to 27, and two contacts are affixed to the plain spring contact 28 opposite the two on spring contact 27. The contacts are cross bar contacts; thus on one of the pair of springs they are parallel to the longitudinal axis of the spring and on the other spring of the pair they are perpendicular to it.

An operating member or card 35 extends into certain of the springs, fitting into the bifurcated portions. The operating card, shown in detail in Fig. 4, has on its body ears 36, a head 37 and an end piece 38. Adjacent one set of the ears is a portion 41 which is slightly wider than the remainder of the body of the card. A similar portion 42 is directly adjacent the head 37. The portion 41 closely fits the bifurcated portion of the spring 26, and is held by extensions 43 on the bifurcated portions of that spring.

The operating card 35 extends through an aperture 46 in the bracket 21 and the head 37 of the card fits slidably in an aperture 45 in the coupling member 15. Two parallel prongs 44 extend from the coupling member 15 and provide a passageway 47 to the aperture 45. In assembly the card is inserted edgewise between the forked ends of the contact springs and through aperture 46 in the bracket 21 after these springs have been clamped together and attached to the bracket. When in position the card is rotated about its longer axis and the portion 41 fitted into the bifurcated section of the spring 26 so that the extensions 43 on the bifurcated ends hold the portion 41 and thus the operating card itself. The coupling member 15 may then be attached to the card by passing the narrow section of the card behind the portion 42 through the passageway 47 between the prongs 44 and then allowing the portion 42 to slip into the aperture 45 in the coupling member. The card 35 is thus held at two points and it will not be dislodged in the normal operation of the switch.

Figure 5:
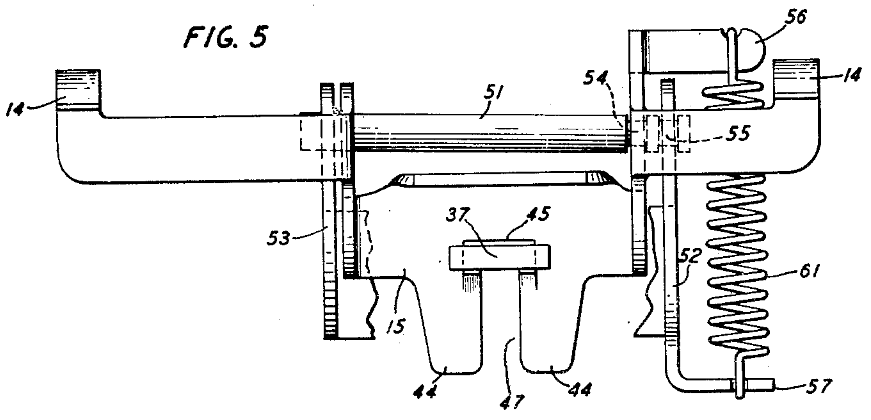
Fig. 5 is a detail view of the coupling between the plungers and operating member in one embodiment of this invention.

The coupling member 15 is positioned on a shaft 51 which is journaled in extensions 52 and 53 of the bracket 21, as shown in Fig. 5. The shaft 51 is provided with two annular grooves, 54 and 55, one of which cooperates with one journal aperture in the coupling member 15 and the other with the journal aperture in the extension 52. The purpose of these grooves will be noted later.

The coupling member 15 has extending from it a lug 56. Directly beneath this lug 56 is another lug 57 on the extension 52. A helical spring 61 extends between these two lugs. The fixed anchorage point of the spring 61, which is the lug 57, and the movable anchorage point, which is the lug 56, are so located with respect to the shaft 51 as to enable the spring to provide sufficient force to lift the plungers 13 when the telephone instrument is removed from the cradle 12. The helical spring 61 also serves an important purpose in moving the contact springs to their closed circuit position when the handset is removed from the cradle.

A third function is performed by the helical spring in combination with the annular grooves 54 and 55 on the shaft 51. The grooves properly align the lug 56 on the movable coupling member with the stationary lug 57 on the extension 52. When the respective lugs are properly registered with the grooves in the shaft, the force of the helical spring maintains this registration, thus preventing the shaft from sliding out of position. In addition, the grooves in the shaft maintain the coupling member in a central position so that it cannot drift sidewise and rub or bind against the adjacent bearing extensions 52, 53 of the switch bracket 21; the operating card 35 which is positioned by the coupling member is thus also kept in proper position to allow clearance through the aperture 46 and proper operation of the contact springs.

In the embodiment of the invention shown in Figs. 1 to 6 a block 62 is the cover for the spring assembly 16. The block is removably attached to the bracket 21 by a pin 63 extending through the block and through apertures in arms 65 extending from and integral with the bracket 21. The block also has two small protuberances 66 which fit into arcuate recesses 67 in housing 17. The block therefore provides for the spring assembly a closed cover which can be easily attached or removed.

Figures 3, 6, 10:
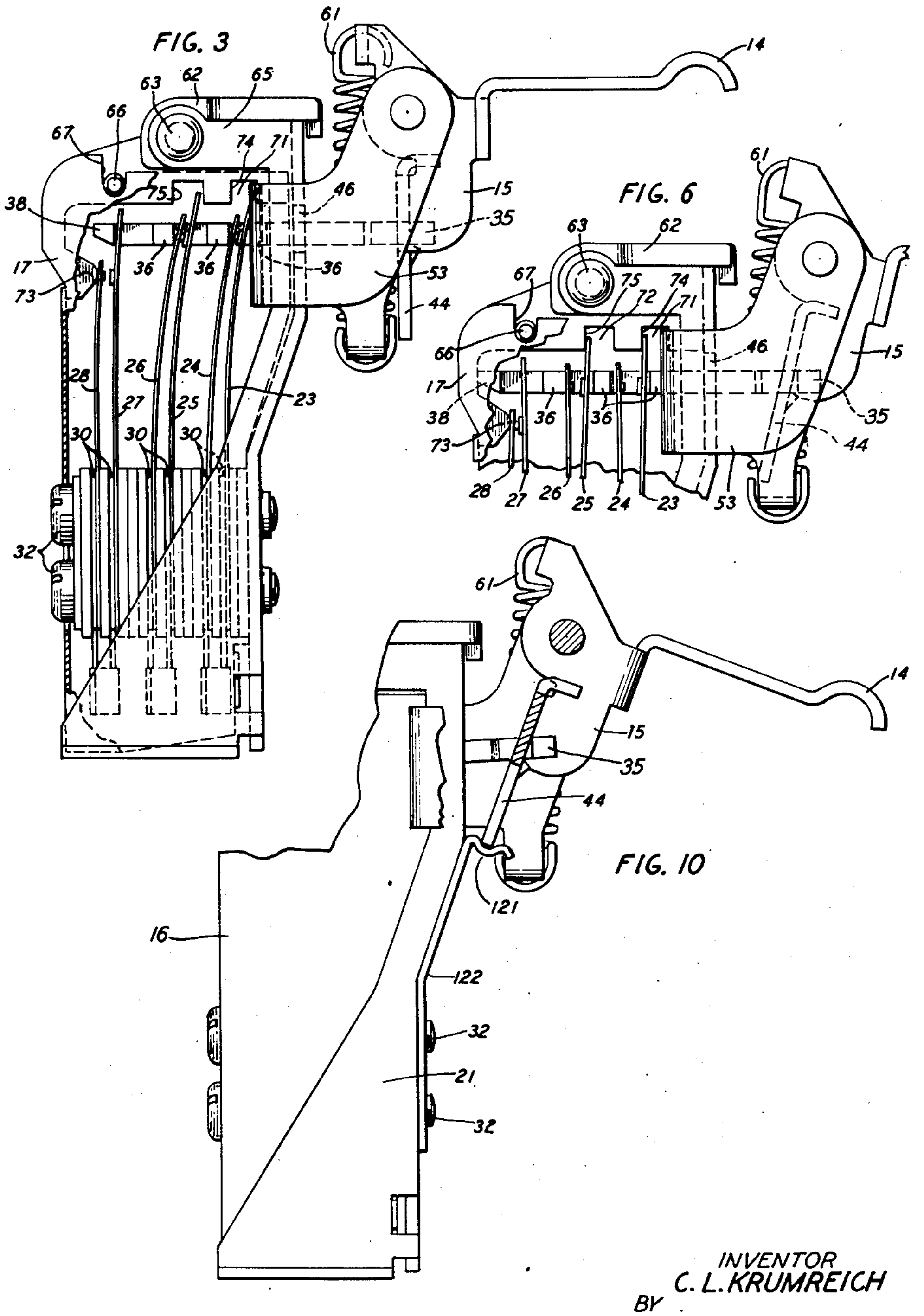
Fig. 3 is a side view of the contact spring assembly illustrated in Fig. 2 with a portion of the housing being broken away and showing the relation of the contact springs in the closed circuit position.
Fig. 6 is a side view of a portion of the contact spring assembly shown in Fig. 2 showing the contact springs in the open circuit position.
Fig. 10 is a side view of a contact spring assembly including a snap catch for the coupling member.

However the block also serves another purpose. On the underside of the block are two grooves 71 and 72 providing stopping surfaces 74 and 75, respectively, for the contact springs 23 and 25. The block has also a raised portion 73 positioning the contact spring 28. The stops 74 and 75 initially position the contact springs 23 and 25, respectively, as shown in Fig. 6, and also determine the amount of travel of the springs 24 and 25 before making the contact, thus giving rise to the proper sequence of operation irrespective of the amount of preset in the individual springs. This cancels out the effect of variations in the fabricated springs and eliminates the need for hand adjustment. Protuberance 73 positions permanently spring 28 and determines the travel of spring 27 before breaking contact. It is apparent that by altering the spacing of the grooves and the placing of the stopping surfaces various sequencies of operation may be obtained.

Figure 7:
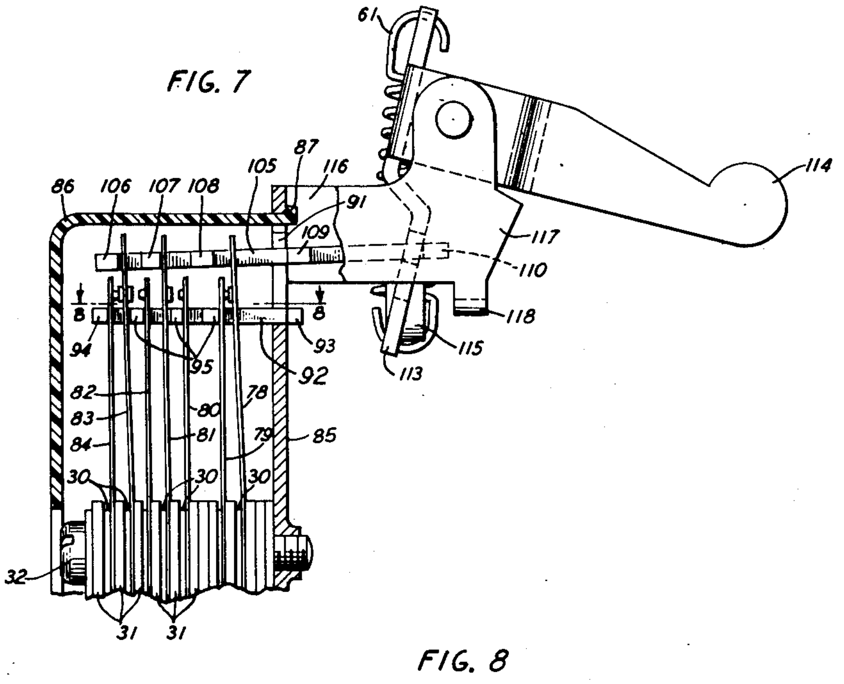
Fig. 7 is a side view of a contact spring assembly illustrative of another embodiment of this invention, the contact springs being shown in the open circuit position.
Figure 8:
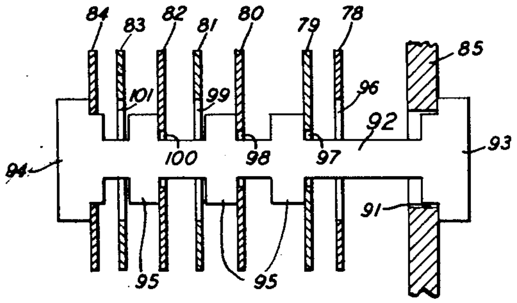
Fig. 8 is a sectional view of the contact springs and fixed member, taken along line 8—8 of Fig. 7.
Figure 9:
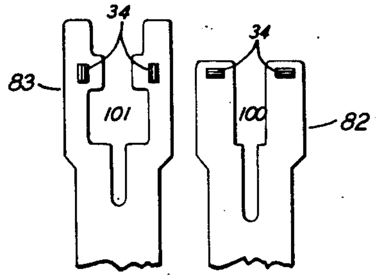
Fig. 9 is a view of the free end portions of one set of the contact springs of Fig. 7 showing the apertures therein for accommodating the fixed member.

Figs. 7, 8 and 9 show a second embodiment of the invention in which the stopping surfaces for positioning the springs are provided by a stationary card also extending through the contact springs rather than by the block 62. Fig. 7 shows the contact springs 78, 79, 80, 81, 82, 83 and 84 mounted within a bracket 85 similar to bracket 21. As before, the springs are insulated from each other by insulators 31 and connected to appropriate leads through terminal lugs 30. The springs, insulators, and lugs are assembled in a row and secured to the bracket 85 by screws 32, only one of which is shown. A housing 86 provides the cover for the assembly. The housing is removably attached to the bracket 85 by a small extension 87 which protrudes into an aperture 91 in the bracket and bears against the bracket just above the aperture. A fixed member or card 92 also extends through the aperture 91 and through all the contact springs, which are bifurcated as shown in Fig. 9 and have apertures at the base of the bifurcated parts for the passage of the card 92. The card 92 has a head 93 which is held in the aperture 91 in the bracket 85, an end piece 94 which is held by the last contact spring 84 just as the portion 41 of the operating card 35 is held by the extensions 43 on the contact spring 26 of the previously described embodiment of the invention, and ears 95 similar to the ears 36 on the operating card 35. Referring to Fig. 8, it will be seen, however, that the ears 95 do not cooperate with all the contact springs. The apertures at the base of the bifurcated portions of the contact springs are of such a size that some of the contact springs can move past the ears 95 without being stopped by them while others are held in position by the ears 95. Specifically, as shown, apertures 96, 99 and 101 in springs 78, 81 and 83, respectively, are wider than the ears 95, while the apertures 97, 98 and 100 on contact springs 79, 80 and 82, respectively, are smaller in width than the ears 95.

Fig. 9 shows the free ends of springs 82 and 83. As shown, the springs have been folded open, i. e. spring 82 to the right and spring 83 to the left, so that both can be viewed from the contact side. The relative sizes of apertures 100 and 101 are thus clearly shown.

An operating member or card 105 also extends through the aperture 91 in the bracket 85 and extends into the bifurcated portions of the contact springs 78, 81 and 83 above the stationary card 92. The operating card 105 is held by the bracket 85 and by the contact spring 81 similar to the way the operating card 35 is held by the contact spring 26. The operating card 105 is provided with ears 106, 107, 108 and 109, the first three of which cooperate with springs 83, 81 and 78, respectively, and the last of which abuts the bracket 85 to limit motion of the operating card into the contact springs. A head 110 on the operating card engages the coupling member 113 so that it is operable by movement of the arms 114. The spring 61 is attached to the coupling member 113 and to a lug 115 on an extension 16 of the bracket 85 as in the prior embodiment. The structure and operation of the coupling member is similar, except for changes in shape, to that of Figs. 1 to 6 except also that a lug 118 is provided from the extension 117 of the bracket 85 to engage the coupling member 113 and to limit its motion in a counter-clockwise direction.

For a large part of the time the telephone set will, of course, not be in use so that the instrument remains in the cradle 12. Thus, referring to Figs. 1 to 6, under the non-operating condition the plungers 13 are depressed downward, forcing the arms 14 down and thereby causing the coupling member 15 to be rotated slightly on the shaft 51. This rotation is accomplished against the pull of the helical spring 61 which is thus extended during non-operating periods. The operating card 35 extends into the springs so that the end piece 38 is against the block just above the raised portion 73. Spring 23 rests on stopping surface 74 and spring 25 on stopping surface 75. The dimensions are made such that these springs need be under only a slight positioning tension; the other contact springs need be under no tension whatsoever. In the specific embodiment of the invention shown, under these conditions contact springs 23 and 24 and 25 and 26 are open, one spring of each pair being held by the stopping surface 74 or 75 while contact springs 27 and 28 are closed. However, the spacings between the open springs 23 and 24 and 25 and 26 are different, in the particular embodiment shown the space between springs 23 and 24 being longer than that between 25 and 26.

Upon removal of the telephone instrument from the cradle 12, the helical spring 61 will force the coupling member to rotate in a counter-clockwise direction so that the fingers 14 and the plungers 13 on the fingers rise. The rotational motion of the coupling member 15 is imparted to the operating card as a lineal motion drawing the card out from the springs until the first ear 36 abuts the bracket 21. As the card pulls out the contacts are made and broken in a predetermined sequence. In the embodiment shown in Figs. 1 to 6, the contact spring 26 will first make contact with the contact spring 25, as the distance between these springs is shorter than the distance between the contacts 23 and 24, which will close next, and also because the ear 36 that engages spring 26 is fixedly positioned adjacent to it thus causing the spring 26 to approach spring 25 before the ear 36 adjacent spring 24 engages spring 24 and imparts motion to it. Then as the card is further withdrawn the end piece 38 picks up the contact spring 27 and opens the contact between it and the fixed contact spring 28. The timing of this final operation is dependent upon the width of the end piece 38 or the distance between it and the last set of ears 36. By properly correlating the sizes and spacings of the ears and end piece on the operating card and the grooves and stopping surfaces on the block, any desired combination of makes and breaks of any desired number of contact springs may be obtained.

The relative times for the closing of the contacts shown in Figs. 3 and 6 can also be considered by noting that, after motion of the card out of the springs has started, the time when the one spring of the pair begins to approach the other is determined by the initial distance between that spring and the ear approaching it and the time when the contact is made is determined by the distance from the first contact spring to the other one which is positioned by the stopping surface. Considering the card to be withdrawn at a constant rate, then the time of closing of any pair of spring contacts is dependent upon the distance from the ear to the first spring and from that spring to the stopping surface. A similar analysis holds for the breaking of normally closed contacts.

When the telephone instrument is returned to the cradle 12, it depresses the plungers 13 which causes the coupling member 15 to rotate as noted above. As the enlarged portion 42 behind the head 37 of the operating card 35 floats in the aperture 45 in the coupling member, rotation of the coupling member acts as a release allowing the card to be moved in towards the contact springs under the slight tensioning of those springs. It is to be noted that when all the contact springs are in proper open circuit position, the end piece 38 of the operating card abuts the block just above the raised portion 73. The coupling member, however, can continue to rotate after the card reaches this position, because of the loose connection between it and the card. This overtravel is accomplished without causing any deflection of the contact springs; thus longer plungers 13 can be used to give rise to a more positive force causing the rotation of the coupling member without longer contact springs to withstand the deflection. This release effect thus also allows the use of shorter contact springs because of the smaller deflection. The spring assembly is, therefore, more compact and takes up less room in the telephone subset.

The operation of the spring assembly with the fixed card is quite similar. Fig. 7 shows the assembly when the telephone instrument is in the portion 12. Upon removal of the instrument the spring 61 causes the coupling member 113 to withdraw the operating card 105 from the contact springs. The ear 107 being attached to spring 81 causes that spring to immediately approach spring 80 which is positioned by the ear 95 on the fixed card 92. The analysis for the relative timing of the opening and closing of the contacts is similar to that of the previous analysis for Figs. 1 to 6. However, it is to be noted that contact spring 83 both opens a circuit with contact spring 84 and closes a circuit with contact spring 82.

Similarly, when the telephone instrument is returned to the portion 12 the operating card will be pulled into the springs further by the tensioning of the springs themselves. The springs cooperating with the operating card, that is, springs 78, 81 and 83, will move steadily with the card while the shorter springs will move until held by the ears 95 on the stationary card 92. In this embodiment, the advantages of the overtravel of the coupling member are provided by having the ear 109 abut the bracket 85 and thus prevent further motion of the operating card while the coupling member can continue to rotate.

The cross bar contacts 34 are positioned on the contact springs so that during each time the contacts open or close the flexing of the springs to which these contacts are attached provides a wiping action between the contacts tending to clean off any dirt or lint on the contacts which might introduce high resistance into the circuit.

Fig. 10 shows a snap catch 121 which may be attached to the contact spring assembly 16 to hold the coupling member in the open circuit, or non-operating, position when the telephone instrument is removed from the cradle and the mounting cover removed for repairs. The catch 121 is attached to the bracket 21 by the screws 32 threaded into two apertures, not shown, in the spring portion 122. The catch 121 is positioned and shaped to engage the parallel prongs 44 extending downward from the coupling member 15. The catch 121 is also so positioned with respect to the prongs 44 that it is not possible during normal operation of the telephone to force the prongs 44 into the catch 121, even by slamming the receiver into the cradle or by pressing down the plungers 13 with one's fingers.

While certain specific embodiments of the invention have been described in detail, the invention is not, of course, limited in its application to such embodiments.

What is claimed is:

1. A mounting for a telephone instrument comprising a housing having a cradle portion for removably supporting the instrument, actuating members extending from within the housing through the cradle portion, a bracket mounted in the housing carrying a rotatable coupling member engaging the actuating members within the housing and a spring enforcing such engagement, the coupling member being rotated in one or in the opposite sense as the instrument is supported or removed, respectively, and being provided with an apertured wing adapted to limit the rotation of the coupling member in the one sense, a switch assembly mounted in the bracket comprising a set of operating and a set of mating leaf contact springs individually supported at one end by the bracket and establishing at their free ends when the instrument is supported in the cradle a desired arrangement of closed and of opened contacts, certain springs of each set being bifurcated at their free ends to form thereat receiving apertures, a fixed member supported at its one end by the bracket and engaging at its other end one of the mating springs, said fixed member having unequally long notches at intervals of its length to receive and provide stopping surfaces for others of the mating springs, and an operating member extending freely through the wing, the bracket and the receiving apertures of at least the operating leaf springs, the operating member being adapted to be drawn outwardly of the bracket when the instrument is removed and having at and intermediate its ends a plurality of unequally spaced transverse ears of which one engages one of the operating leaves and the others engage sequentially the wing and the remaining operating leaves when the coupling member is rotated in the opposite sense thereby in the desired sequence modifying the arrangement of closed and opened contacts.

2. A mounting for a telephone instrument comprising a housing having a portion for removably accommodating the instrument, an actuating member extending from within said housing into said portion, a first, a second and a third set of contact springs in said housing, and means comprising a pair of members for determining the operation of said sets of contact springs in a prescribed sequence whereby the contacts of the first set are closed and those of the second and third sets are opened when the instrument is accommodated and are operated when the instrument is removed to close first the contacts of the second set, then those of the third set and thereafter to open those of the first set, one of said pair of members being fixed and the other of said pair of members being movable with said actuating member.

3. In a mounting for removably supporting a telephone instrument, a contact spring assembly comprising a housing, a cover for the housing having grooves on its under side, a plurality of sets of contact springs mounted in the housing, certain of the springs extending into the grooves, an operating card extending into the assembly and provided with an ear cooperating with one of the springs and unequally spaced ears adapted to cooperate in a predetermined sequence on motion of the card with the remaining other springs and means operative on removal of the instrument for imparting motion to the card.

4. A mounting for a telephone instrument comprising a housing having a portion for accommodating the instrument, an actuating member extending from within said housing into said portion and a unitary contact spring assembly within said housing comprising a plurality of sets of contact springs mounted in a row in a holder, a cover for said holder having grooves on the under side thereof, certain of said contact springs extending into said grooves, an operating card extending through certain of said contact springs and having an ear cooperating with at least one of said springs and unequally spaced ears adapted on motion of the card to cooperate in a required sequence with others of said springs, a coupling member between said actuating member and said operating card, and a helical spring attached to said holder and biasing said operating card in the direction away from said springs.

5. In a mounting for a telephone instrument, a contact spring assembly comprising a housing, a plurality of sets of contact springs mounted within said housing and having apertures therein, said apertures being of two types, a stationary member extending through said apertures and having ears thereon, said ears being of such a size that apertures of said first type pass by said ears and apertures of said second type are held by said ears, an operating card extending through certain of said contact springs and having unequally spaced ears adapted on motion of the card to cooperate in a prescribed sequence with certain of said contact springs, and means responsive to the removal of said instrument from said mounting for imparting motion to said card.

6. A mounting for a telephone instrument comprising a housing having a portion for removably accommodating the instrument, an actuating member extending from within the housing into said portion, a unitary contact spring assembly supported in a fixture within the housing, the assembly including a plurality of sets of contact springs, each set including a longer and a shorter spring, said springs being mounted in a row and having at their free ends bifurcations defining apertures of one and of another size, the longer springs having the larger apertures, a stationary card extending through all the apertures and provided with unequally spaced ears of a size intermediate the aperture sizes, said ears engaging individually the shorter springs when the instrument is accommodated, an operating card extending through the bifurcations of the longer springs and provided with unequally spaced ears adapted to deflect sequentially the free ends thereof when the operating card is drawn theretoward thereby successively making a first and a second contact between the springs of the first set and then between those of a second set and thereafter opening the contact between the springs of a third set, a coupling member pivotally supported by the fixture engaging the operating card and the actuating member and a helical spring attached between the fixture and the coupling member to draw the operating card toward the longer springs when the instrument is removed.

CHARLES L. KRUMREICH.

REFERENCES CITED

The following references are of record in the file of this patent:

UNITED STATES PATENTS

| Number | Name | Date |
|---|---|---|
| 348,936 | Turnbull | Sept. 7, 1886 |
| 378,250 | Hinton | Feb. 21, 1888 |
| 1,106,187 | Bossu | Aug. 4, 1914 |
| 1,997,655 | Sanford | Apr. 16, 1935 |
| 2,197,844 | Walker | Apr. 23, 1940 |
| 2,279,713 | McLarn | Apr. 14, 1942 |
| 2,279,811 | Baker | Apr. 14, 1942 |
| 2,282,687 | Vigren et al. | May 12, 1942 |
| 2,301,472 | Stockfleth | Nov. 10, 1942 |
| 2,338,250 | Logan | Jan. 4, 1944 |
| 2,350,458 | Hibbard | June 6, 1944 |
| 2,375,681 | Obergfell | May 8, 1945 |
| 2,452,568 | Harrison | Nov. 2, 1948 |
| 2,461,360 | Vincent | Feb. 8, 1949 |